US011181922B2

(12) United States Patent
Reschka et al.

(10) Patent No.: US 11,181,922 B2
(45) Date of Patent: Nov. 23, 2021

(54) EXTENSION OF AUTONOMOUS DRIVING FUNCTIONALITY TO NEW REGIONS

(71) Applicant: Zoox, Inc., Foster City, CA (US)

(72) Inventors: Andreas Christian Reschka, Foster City, CA (US); Collin MacGregor, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 289 days.

(21) Appl. No.: 16/370,696

(22) Filed: Mar. 29, 2019

(65) Prior Publication Data

US 2020/0310450 A1  Oct. 1, 2020

(51) Int. Cl.
*G05D 1/02* (2020.01)
*G05D 1/00* (2006.01)
*G06F 16/29* (2019.01)

(52) U.S. Cl.
CPC ......... *G05D 1/0221* (2013.01); *G05D 1/0088* (2013.01); *G05D 1/0274* (2013.01); *G06F 16/29* (2019.01); *G05D 2201/0213* (2013.01)

(58) Field of Classification Search
CPC .. G05D 1/0221; G05D 1/0088; G05D 1/0274; G05D 2201/0213; G06F 16/29
See application file for complete search history.

(56) References Cited

U.S. PATENT DOCUMENTS

| 2014/0303828 | A1  | 10/2014 | Joshi |
| 2017/0248963 | A1  | 8/2017  | Levinson et al. |
| 2019/0086928 | A1* | 3/2019  | Chen ................... G05D 1/0231 |
| 2020/0160068 | A1* | 5/2020  | Silver ................ G01C 21/3833 |

FOREIGN PATENT DOCUMENTS

| DE | 102015209101 A1 | 11/2016 |
| DE | 102017122440 A1 | 3/2019  |
| EP | WO2018073260 A1 | 4/2018  |

OTHER PUBLICATIONS

The PCT Search Report and Written Opinion dated Jul. 9, 2020 for PCT Application No. PCT/US2020/023615, 10 pages.

* cited by examiner

*Primary Examiner* — Abby Y Lin
*Assistant Examiner* — Renee LaRose
(74) *Attorney, Agent, or Firm* — Lee & Hayes, P.C.

(57) ABSTRACT

Autonomous vehicles use accurate and detailed maps for navigation. Expanding functionality of an autonomous vehicle to a new, e.g., unmapped, region can include determining drivable surface segments of the new region and comparing the segments to segments or classes of segments from an already-mapped region. Segments of the new region that are similar to segments from the mapped region can be identified as potentially navigable. An autonomous vehicle can travel through the new region via those segments indicated as navigable. In addition, during travel through the new region, data may be collected using sensors on the autonomous vehicle to map additional portions of the region and/or confirm a driving ability in the new region. Functionality of an autonomous vehicle may be limited based on how similar the segments are to one another.

20 Claims, 6 Drawing Sheets

EXTENSION OF AUTONOMOUS DRIVING FUNCTIONALITY TO NEW REGIONS

BACKGROUND

Vehicles are increasingly supplementing or replacing manual functionality with automatic controls. Semi-autonomous vehicles may assist a driver with some functionalities, e.g., collision avoidance and braking, while fully-autonomous vehicles may reduce all passengers to passive participants as they are shuttled to their destination. Often, this increased automation requires a detailed understanding of an environment of the vehicle, e.g., in the form of detailed maps. For unmapped regions, e.g., areas an autonomous vehicle has not yet been tested for autonomous driving, however, obtaining the detail and understanding of the environment can be very costly and time-consuming, often requiring thousands or more of hours and/or miles.

DETAILED DESCRIPTION

Figure 1:
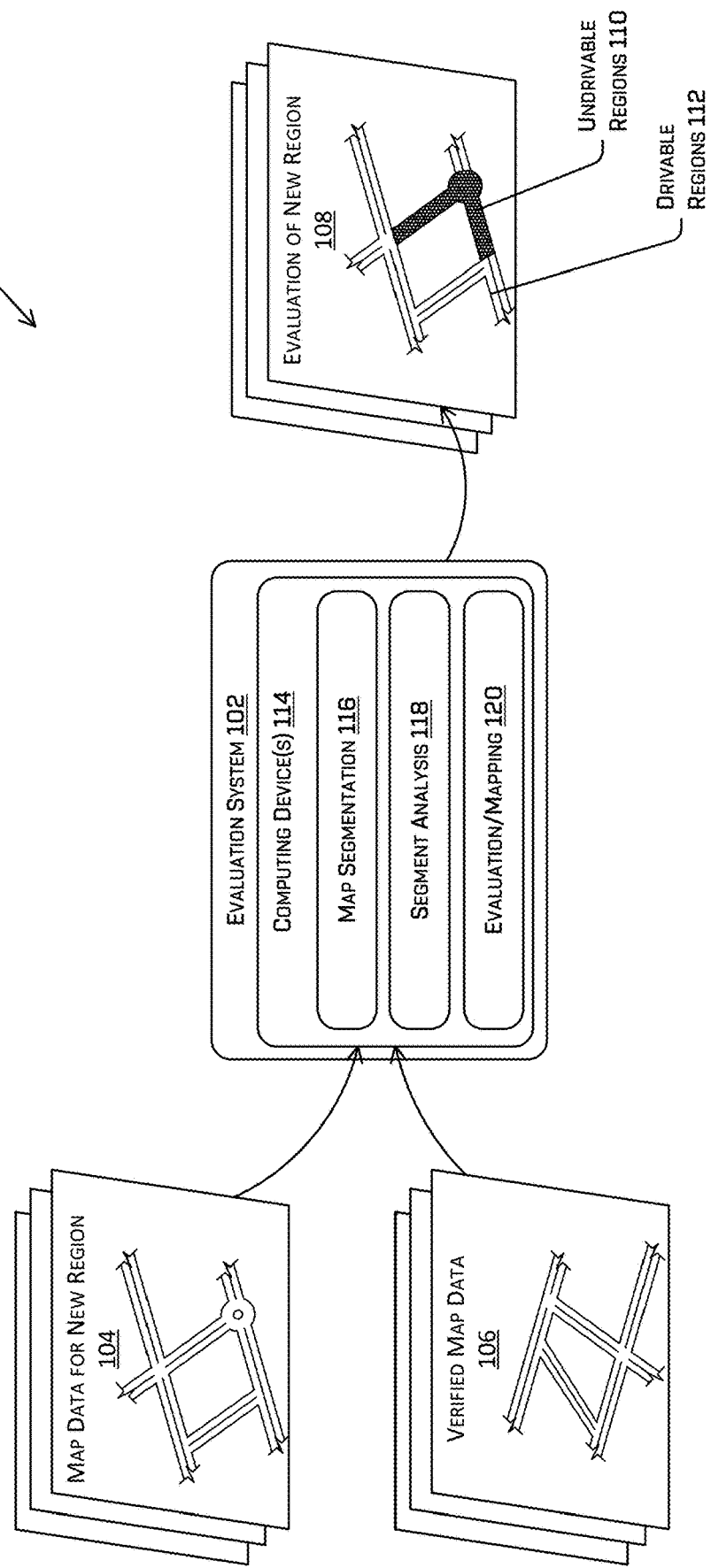
FIG. 1 illustrates an example of extension of autonomous driving functionality to new regions according to aspects of this disclosure.

The following detailed description is directed to systems and processes for controlling an autonomous vehicle in an environment, including a new environment in which the autonomous vehicle has not previously traveled. Unlike conventional automobiles, some autonomous vehicles may not have onboard navigation controls, e.g., steering wheels, transmission controls, acceleration controls, and/or braking controls, that readily allow for manual control. Therefore, such autonomous vehicles may require detailed maps of regions, which maps may include details about drivable surfaces, e.g., extents, grades, surface types, or the like, about lane and street configurations, about traffic rules, and so forth. Generating such sophisticated maps may require large amounts of data about the region, and acquiring such data has often conventionally requires extended amounts of manual driving in the region. Moreover, even when sophisticated maps are generated, readying a vehicle for autonomous driving may still require additional training of the vehicle in the newly mapped areas. The techniques described herein may reduce the time and/or effort required to extend autonomous driving into new areas. For instance, this disclosure provides systems and methods for evaluating new, e.g., previously unmapped for autonomous driving, geographic regions, and for controlling an autonomous vehicle in such regions. The techniques described herein also may update and/or generate new map data of previously unverified regions. Such map data may be used to facilitate control of autonomous vehicles in those previously unmapped region, such that the vehicle can obtain sensor data about those regions, to further update map data.

In some examples, the techniques described herein may evaluate new regions, e.g., for potential navigation by an autonomous vehicle, by comparing available map data for the new region to map data and/or additional vehicle data for regions in which the vehicle is already operating autonomously. For example, an autonomous vehicle may be proficient at driving in some locale, e.g., a city, a portion of a city, or the like, (as may be determined based on, for example, an ability to perform certain maneuvers, to operate safely, to recognize various scenarios which may occur at the portion, etc.) and that proficiency may be at least in part based on the availability of detailed map data. For instance, such map data may be acquired, generated, supplemented and/or updated over careful investigation of the locale, including using sensor data captured by sensors mounted on vehicles as those vehicles traverse the drivable surfaces in the area. For instance, the detailed map data of a navigable (by the autonomous vehicle) region may include information about the physical extents and arrangement of the drivable surface. Such information can include lengths and widths of streets, layouts of intersections, severity of surface grades, positions and arrangements of buildings, fire hydrants, or other fixtures, and other elements. The map data may also include information about features and conditions that affect travel on the drivable surfaces. For instance, the map data may include information about speed limits, crosswalks, traffic lights, street signs, or the like, as well as the impact such elements have on driving in the environment. In at least some examples, such map data may further comprise weather, climate, and/or other environmental features which may impact driving autonomously in such regions (average daylight, average precipitation, average temperatures, any snowfall or ice, etc.).

As used herein, "verified map data," "data for a mapped region," and/or "data for a verified region" may refer to map data associated with geographic areas or locales for which an autonomous vehicle is verified or otherwise configured to operate, e.g., autonomously. Similarly, a "mapped region" or "verified region" may refer to those geographic areas or locales. In contrast, "map data for a new region," "unverified map data," and similar terms may refer to map data associated with geographic areas or locales for which an autonomous vehicle is not yet verified and/or that is insufficient to enable an autonomous vehicle to operate safely and/or legally based thereon. Similarly, an "unmapped region," a "new region," and an "unverified region" may refer to such geographic areas or locales. Thus, map data may be available for "unmapped," "new" or "unverified" regions, but such map data may be insufficient for autonomous travel.

In some examples, techniques described herein can parse map data (e.g., verified map data and/or map data of a new region) into multiple segments of a drivable surface. For example, techniques of this disclosure may generate segments from the map data. In some instances, a segment can include a junction segment, e.g., an intersection, a merge, or the like, or a connecting road segment, e.g., an extent of a road between junctions. Systems described herein can also associate data with each of the individual segments. For instance, a junction segment may include a junction type, e.g., a merge, a "T," a round-about, or the like; a number of roads meeting at the junction; a relative position of those roads, e.g., an angle between the roads meeting at the junction; information about traffic control signals at the junction; and/or other features. Data associated with a connecting road segment can include a number of lanes, a width of those lanes, a direction of travel in each of the lanes, an identification of parking lanes, a speed limit on the road segment, and/or other features.

In examples, techniques described herein can compare segments of a drivable surface of a new region, e.g., identified in map data of the new region, with segments of a drivable surface of a verified region, e.g. identified in verified map data. In implementations, map data for the new region can be obtained from a number of sources, including but not limited to third-party vendors. In some examples, such map data may include 2D map data, 3D map data, satellite imagery, and/or other types of map data. In examples, any map data that provides information about a drivable surface in the new region may be used.

In some examples described herein, various metrics may be determined to define how well an autonomous vehicle drives in such existing segments. As non-limiting examples, such metrics may comprise a number of occurrences over a period of time that teleoperation intervention was necessary, passenger comfort (e.g., bumps, jerks, etc.), the ability for the vehicle to navigate the segment at all, a percentage of scenarios in which the vehicle can safely overcome (e.g., if the segment comprises an intersection with an unprotected left the vehicle is unable to navigate), etc. Such metrics may be used with the map data to indicate segments which are drivable and a level of ability associated therewith.

In some examples, techniques described herein can group segments of the drivable surface in a verified region, e.g., according to a segment classification or segment stereotype. By way of non-limiting example, all junction segments that conform to some range of metrics or attributes may be grouped together (e.g., using k-means, evaluating a weighted distance (e.g., Euclidian) between segment parameters, or otherwise clustering such segments based on segment parameters). For instance, an autonomous vehicle may be expected to perform (and/or may have demonstrably performed) the same in each of the junctions within a stereotype. Similarly, connecting road segment stereotypes can also be grouped according to one or more similarities. By way of non-limiting example, all two-lane road segments having a speed limit within a 10-mph range may be associated with the same stereotype. In some examples, the use of stereotypes can reduce a number of comparisons to be made to determine an analogous segment.

In some examples, the techniques described herein can compare segments of the new region with segments (or stereotype classifications) of the verified region. For example, a comparison may determine whether, and to what extent, segments in the new region are similar to one or more navigable segments from the mapped region. In some examples, the similarity may be expressed as a similarity metric, score, or other value. In some examples, segments in a new region that have a similarity metric, value, or score equal to or above a threshold value may be identified as (likely to be) navigable by an autonomous vehicle. In contrast, segments in the new region that have a similarity metric, score, or value, below the threshold may be identified as non-navigable by the autonomous vehicle. In some examples, various driving features may be associated with each new segment. As non-limiting examples, full operation in all conditions may be associated with one segment, whereas single directions of travel, weather and/or environmental condition-limited travel, and the like may be imposed on driving autonomously in such segments. Such driving features may generally be referred to as a policy (e.g., an expected set of actions and/or limitation on such actions such as, but not limited to, a maximum speed limit, refraining from overcoming double parked vehicles, refraining from performing additional maneuvers, etc.).

Techniques described herein may also generate updated or new map data based on the indications of drivable and non-drivable segments in the new region. For example, map data associated with individual segments may be flagged, tagged, or otherwise appended or amended to indicate that the segment is or is not likely to be drivable (or otherwise have limited autonomous functionality). In some examples, the map data can be uploaded or otherwise made accessible to an autonomous vehicle. Techniques described herein can include controlling the vehicle to travel in the new region using the updated or new map data.

Also in examples, as the autonomous vehicle is controlled according to the new map data, navigation of the vehicle can be assessed. For instance, techniques can determine whether the vehicle operates within predefined criteria, which may be based at least in part on one or more of safety considerations, legality considerations, passenger comfort considerations, and so forth. In some examples, information that the vehicle is not functioning properly in a segment determined to be drivable or navigable may update processing that determined the similarity of the segment to a verified segment. For example, techniques described herein can determine differences between attributes of the segment in the new region and the verified segments or stereotypes. In some examples, the differences can be used to update stereotypes and/or to create new stereotypes.

The techniques discussed herein can improve functioning of an autonomous vehicle in a number of ways. For example, the techniques discussed herein may facilitate travel in unmapped regions and may facilitate mapping of those unmapped regions. Moreover, techniques described herein can improve the functioning of a computer, e.g., by reducing the amount of processing necessary to evaluate and/or map new regions. The techniques described herein also may allow for navigation of an area, e.g., by an autonomous vehicle, prior to generating and/or otherwise acquiring detailed maps of the entire region. These and other improvements to the functioning of the autonomous vehicle, computing systems associated with the autonomous vehicle, and/or to the user experience are discussed herein.

The techniques described herein can be implemented in a number of ways. Example implementations are provided below with reference to the FIGS. 1-6. Although discussed in the context of an autonomous vehicle, the methods, apparatuses, and systems described herein can be applied to a variety of systems, and is not limited to autonomous vehicles. In another example, the techniques can be utilized in robotic, aviation, and/or nautical contexts, e.g., to extend navigational coverage for devices.

FIG. 1 is a schematic diagram 100 of aspects of this disclosure. More specifically, FIG. 1 illustrates an evaluation system 102 for determining whether and/or what portions of an unverified (for autonomous navigation) area may be navigable, even in the absence of detailed map data of the type and specificity generally required for a vehicle control system of an autonomous vehicle to navigate the area. As illustrated, the evaluation system 102 may be configured to receive or otherwise access map data for a new region 104, e.g., an "unverified region," and to receive or otherwise access verified map data 106. For example, the "new region" may be a geographic area for which operation of an autonomous vehicle has not been verified. For instance, the new, unverified, or unmapped region may be an area or region adjacent to an already-mapped area, e.g., to extend an existing drivable area or geofence for the autonomous vehicle, or may be an entirely new geographic area, e.g., a different city. As detailed further herein, the map data for the new region 104 may take any form of data from which aspects of a drivable surface in the new region may be gleaned. For instance, the map data for the new region 104 can include any two- or three-dimensional map data providing information about the new region, including but not limited to map data available from a third party, such as satellite imagery, manually-generated maps, or the like. In contrast, the verified map data 106 may be map data of one or more geographic areas for which operation of the autonomous vehicle has been verified. The verified map data 106 may include detailed maps used by one or more autonomous vehicles to travel in an area, for example, utilizing simultaneous localization and mapping (SLAM) techniques. For instance, the verified map data 106 may include a 3D mesh of an environment, including a drivable surface, as well as information about aspects of the drivable surface, including but not limited to extents of the drivable surface, road marking information, traffic control information, or the like. In at least some examples, the map data for the new region 104 and/or the verified map data 106 can include simulated map data. In such examples, approximate road parameters (grade, width, etc.) and/or actual road parameters (speed limits, number of lanes, etc.) may be used to generate such synthetic segments which approximate real world road segments. For instance, simulated map data can be used to test aspects of the implementations described herein and/or aspects of an autonomous vehicle. Thus, as used herein, a new region and/or an unverified region may refer to a geographic area for which detailed map data, e.g., sufficient to enable autonomous vehicle operation, is not available. In contrast, a verified region and/or a mapped region may refer to a geographic area for which map data and/or driving data exists (e.g., the verified map data 106) which may be used by an autonomous vehicle to navigate that area, e.g., autonomously.

The evaluation system 102 can generate an evaluation of the new region using the map data for the new region 104 and the verified map data 106. The evaluation 108 can identify non-drivable segments or areas 110 and drivable segments or areas 112 in the new region. In some examples, the evaluation system 102 can determine a similarity or resemblance of road segments in the new region to road segments in the mapped region to determine the non-drivable areas 110 and the drivable areas 112. For instance, the non-drivable areas 110 may be areas that the evaluation system 102 determines unlikely, e.g., equal to or below some similarity metric threshold, to be navigable by an autonomous vehicle, whereas the drivable regions 112 may be areas that the evaluation system 102 determines likely, e.g., equal to or above some similarity metric threshold, to be navigable by the autonomous vehicle.

In more detail, the evaluation system 102 can include one or more computing devices 114 configured to receive and/or otherwise access the map data for the new region 104 and the verified map data 106. In general, and in some instances, the computing device(s) 114 can include various components to perform various processing and/or operations on the map data for the new region 106 and the verified map data 108. For example, the computing device(s) 114 can include a map segmentation component 116, a segment analysis component, and an evaluation/mapping component 120.

The map segmentation component 116 can include functionality to identify segments of map data corresponding to discrete portions of a drivable surface in a geographic area. In some instances, the discrete portions can include road junctions and connecting road segments. A road junction may be a confluence of two or more connecting road segments and a connecting road segment may be a portion of a road extending between two junctions. In other examples, the discrete portions may be segments of road junctions and/or connecting road segments. For instance, the map segmentation component 116 can identify individual lanes or groupings of two or more lanes in either a road junction or a connecting road segment. Similarly, the map segmentation component 116 can include functionality to identify portions of a junction, e.g., the junction of two road segments at a four-way intersection. As can be understood, a drivable surface can include a number of physical portions, and the segments should not be limited to those expressly discussed herein. In some instances, a map segment can define a location, an extent, and semantic information associated with the map segment. As described further herein, the map segmentation component 116 can include functionality to identify segments in the map data for the new region 104 and in the verified map data 106.

The map segmentation component 116 can implement a number of techniques for identifying segments in map data for the new region 104 and/or the verified map data 106. By way of nonlimiting example, when the map data includes image data, the map segmentation component 116 can implement feature recognition techniques, including not limited to edge detection techniques, to determine the extents of a drivable surface and/or lane markings on the drivable surface. In other examples, the map segmentation component 116 can implement segmentation and or classification techniques on the map data, e.g., to identify portions of sensor data associated with different classifications. In some examples, drivable surface can be a classification identified using semantic segmentation. In at least some examples, various clustering based algorithms may be used to identify certain lane segments (k-means, k-mediods, DBSCAN, etc.) based on any one or more of the road parameters. Other techniques also may be used.

The map segmentation component 116 can also associate features or attributes, e.g., non-physical features/attributes, with identified physical segments. For instance, the map segmentation component 116 can also associate traffic control information for the portion of the drivable surface associated with segments. By way of non-limiting example, the traffic control information can include information about a speed limit, about a direction of travel, about traffic control devices, e.g., stop signs, yield signs, traffic lights. Additional traffic control information can include information about cross walks, parking zones, no-parking zones, bike lanes, HOV information, or the like. In implementations, the map segmentation component 116 can identify physical drivable surface segments and associate any and all information that can impact safe and legal travel in such segments.

Further, in at least some examples, the map segmentation component 116 may use previously recorded driving data from one or more vehicles associated with each segment to provide a level of autonomy associated with each segment. As non-limiting examples, various segments may be identified as having an ability to drive fully autonomously in all environmental conditions, limited autonomy (speed limits, maneuver limits, etc.), and having no ability to have full autonomy.

The segment analysis component 118 can include functionality to compare segments identified by the map segmentation component 116 and determine similarities therebetween. For instance, the segment analysis component 118 can identify segments from the map data for the new region 104 that are similar to or the same as segments from the verified map data 106. In some examples, the segment analysis component 118 can compare individual of the segments from the map data from the new region 104 to individual of the segments from the verified map data 106 to find analogs. Such analysis may comprise determining a distance (e.g., a Euclidian distance) between a feature vector associated with one segment and the one or more clusters or segments identified in the map segmentation component 116. According to a simple, non-limiting example, when the map segmentation component 116 identifies a relatively straight, two-lane connecting road segment with a 30-mph speed limit in the map data for the new region 104, the segment analysis component 118 can look for relatively straight, two-lane connecting road segments with a 30-mph speed limit in the verified map data 106. In this simple example, the measured attributes, e.g., the straightness of the road segment, the number of lanes, and the speed limit may be substantially identical. In other examples, however, the similarities may be less exact. For example, the new region may include a two-lane connecting road segment with some degree of curvature and a 40-mph speed limit. In examples described herein, the segment analysis component 118 can determine a similarity metric that quantifies a similarity of the segment in the new region to one or more segments in the verified region.

In some examples, a similarity metric may factor in a number of attributes and determine how many of those attributes of the same between compared segments and/or similar. Some example attributes can include physical attribute or traffic control attributes. Physical attributes may include, for example, extents (e.g., length, width), a number of lanes, a curvature, a grade, a road type (e.g., paved, gravel, dirt, market, unmarked), a curb or no curb, a median or no median, and the like. Traffic control attributes can include, for example, information about the speed limit, a direction of travel, traffic control elements (e.g., traffic lights, stop signs, yield signs), crosswalks, bike lanes, HOV rules, turning rules (e.g., no left turn, no right on red), or the like. In some instances, a similarity metric or similarity score may be binary, e.g., 1 or 0, match or no match, drivable or not drivable. Of course, in other examples, such a score may be continuous and indicate how similar one segment is to another and lower levels of similarity may be associated with disabling certain driving features (e.g., driving over a certain speed limit, performing certain maneuvers (like overcoming double-parked vehicles autonomously, etc.)). In some examples, when certain attributes are not identical in two compared segments, the similarity metric may indicate that there is no match, regardless of other attributes being the same or similar. By way of nonlimiting example, a two-lane segment of road that has one lane dedicated to travel in one direction and a second lane dedicated to travel in the opposite direction will not be a match for a two-lane segment of road that has both lanes dedicated to travel in the same direction. In contrast, other attributes may be different, but the segments may still be a match. By way of nonlimiting example, two road segments that are virtually identical, except for the speed limit being 5 mph different may be matches. In this example, the similarity metric may take into account a degree of difference between the two attributes. For instance, speed limits that vary by 5 miles per hour may be more similar than speed limits that vary by 20 miles per hour. In at least one example, the similarity metric may assign a value, e.g., a numerical value representative of this degree similarity and the segment analysis component 118 can generate a composite or other score that includes similarly different attributes.

The segment analysis component 118 can also consider information about segment stereotypes. For example, a stereotype may define parameter values, or ranges of parameter values, that define a road segment type. In some examples, a stereotype may be embodied by a representative segment, e.g., a segment that includes the attributes/parameters/ranges associated with the stereotype. The segment analysis component 118 can determine road segments that are similar to or include such parameters/ranges. For example, stereotypes may group together all segments that are sufficiently similar that the autonomous vehicle is expected to (or has proven to) behave similarly. For example, such similarity in behavior may be observed over hours and/or miles of driving over road segments. In some instances, the segment analysis component can execute a machine learning model to group similar road segments in stereotypes and/or to update stereotypes. Thus, in examples of this disclosure, the segment analysis component 118 can compare road segments from the map data for the new region 104 with stereotypes determined from and/or included in the verified map data.

The evaluation/mapping component 120 can include functionality to evaluate results of the segment analysis component 118 and update the map data for the new region 104 to identify the non-drivable regions 110 and the drivable regions 112 (and/or limitations to driving ability). For instance, the evaluation/mapping component 120 can determine, e.g., from similarity metrics determined by the segment analysis component 118, sections of the new region that are substantially similar to segments for which the autonomous vehicle is already verified for autonomous travelling (e.g., from the verified map data 106). In at least some examples, a similar level of autonomy corresponding to the original segment may be associated with such new segments. In examples, segments of the map data for the new region 104 for which there is no analog in the verified map data 106 may be flagged or otherwise indicated as not verified for travel. Similarly, segments of the map data for the new region 104 for which there is an analog in the verified map data 106 may be flagged or otherwise indicated as verified (or potentially verified) for travel. As above, in at least some examples, a limited amount of autonomy (or other limitations on functionality) may be associated with the one or more segments based on the similar segments determined. In some instances, the evaluation/mapping component 120 can generate new map data, e.g. by supplementing the map data for the new region 104 with the indications of the drivable regions 112 and provide the updated (or new) map data to an autonomous vehicle, e.g., to equip the autonomous vehicle to operate in the drivable regions 112, e.g., at the exclusion of the non-drivable regions 116.

The evaluation/mapping component 120 can also determine an overall score or coverage for the new region. For instance, once each of the segments in the map data for the new region 104 is flagged as either undrivable or drivable, the evaluation/mapping component 120 can determine an overall coverage of the new region. In some examples, an overall score or coverage can correspond to a percentage of the drivable area in the new region that is indicated as containing the drivable regions 112. Other evaluation and/or scoring metrics also may be used. For example, the evaluation/mapping component 120 may consider additional information about the new region. For instance, in the context of a ride-hailing service, it may be desirable to determine whether the drivable regions 112 include pickup/drop-off locations. The evaluation/mapping component 120 may determine a percentage of the segments of the map data for the new region 104 that also include exposed curves, parking lanes, driveways, parking lots, or other attributes that may be conducive to pickup/drop-off. In additional examples, the evaluation/mapping component 120 can determine a metric that identifies how much of the new region is connected. For instance, a determination that the drivable regions 112 in a new region allow for travel throughout most of the region may be relatively higher-scored than a determination that the drivable regions 112 are far from each other, e.g., with few or no connecting roads.

Thus, according to techniques described herein, a determination of how well a vehicle control system will fare in a new region can be determined using map data for a verified region and map data for the new region. Even though the map data for the new region 104 may be less detailed or specific than the verified map data 106, the evaluation system 102 can provide meaningful information about the potential for an autonomous vehicle operating in the region. In some implementations, the evaluation system 102 can aid in determining whether to provide autonomous vehicle services to a new region and/or which new region(s) to enter.

Figure 2:
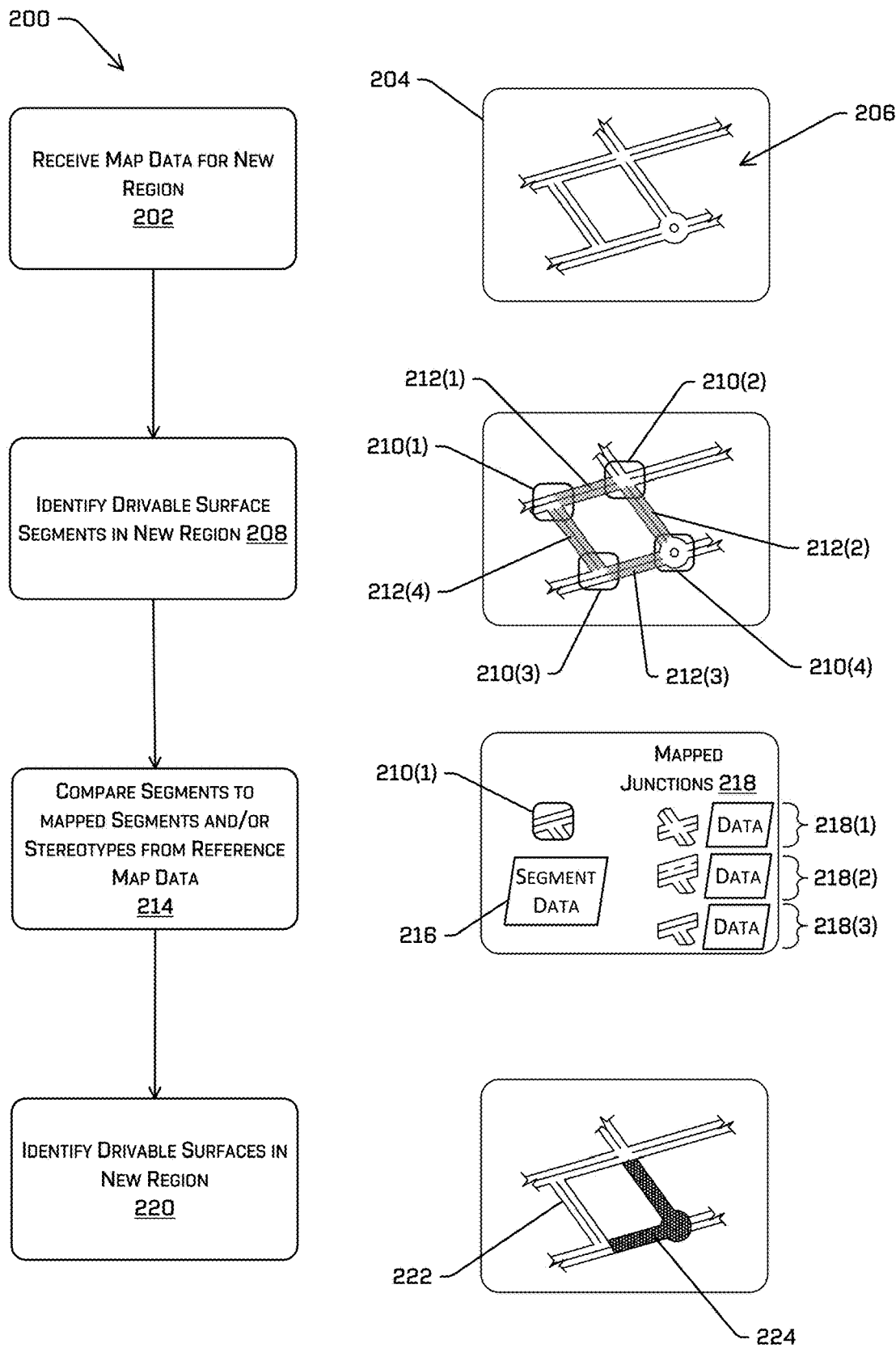
FIG. 2 includes textual and visual flowcharts to illustrate an example method for extending autonomous driving functionality to new regions.

FIG. 2 depicts a pictorial flow diagram of an example process 200 for identifying drivable surfaces in a new region and/or associating autonomous features therewith. For example, the process 200 may be implemented by one or more components of the evaluation system 102, although the process 200 is not limited to use with the evaluation system 102, and the evaluation system 102 may perform operations and/or processes in addition to the process 200.

At operation 202, the process 200 may include receiving map data for a new region. For example, the new region may be an extension of an already-mapped region or a completely new region, e.g., corresponding to a new city or location. An example 204 accompanying the operation 202 includes a graphical representation of a map 206 of the new region. For example, the map 206 may be representative of the map data for the new region 104, discussed above in connection with FIG. 1. In examples of this disclosure, the map data may be any number of data types including representative information of a locale. In particular, techniques described herein may use any map data from which information about a drivable surface in the new region can be determined. In some examples, such a map 204 may be created based on collected data from one or more sensors of a vehicle collected during mapping. In some examples, the map 204 may be determined based on simulated (synthetic) data, generated by a user, or a combination of simulated portions with sensor data. In any such example, additional parameters corresponding to the road may be associated with various portions of the map (speed limits, stop signs, traffic signals, lane indicators, crosswalks, etc.).

At operation 208, the process 200 can include identifying drivable surface segments in the new region. In an example accompanying the operation 208, a number of regions of the map 206 are specified. For example, in the illustration, four junctions 210(1), 210(2), 210(3), 210(4) (collectively, the junctions 210) and four connecting road segments 212(1), 212(2), 212(3), 212(4) (collectively, the connecting roads 212) are enumerated (portions of additional road segments also are illustrated, but not labeled). In this example, each of the junctions 210 is a confluence of two or more of the connecting roads 212 and each of the connecting roads 212 extends between two of the junctions 210. In more detail, a first junction 210(1) and a third junction 210(3) may be "T" type junctions at which three of the connecting road segments converge. In the particular example of the first junction 210(1), the three connecting road segments include the first connecting road 212(1), the fourth connecting road 2212(4), and an unlabeled connecting road segment that is a continuation of the first connecting road 212(1). The second junction 210(2) and the fourth junction 210(4) may be different types of intersections. For example, the second junction 210(2) is illustrated as a four-way intersection, and the fourth junction 210(4) is illustrated as a traffic circle or roundabout. Of course, these are only examples of junctions.

As will be appreciated, the map 206 may provide only a small section of a (much) larger area. Thus, in some implementations, there may be hundreds and potentially thousands or more junctions 210 and a similar number of connecting roads 212. Moreover, each junction may have its own characteristics and/or each connecting road 212 may have its own characteristics. By way of nonlimiting example, although the first junction 210(1) and the third junction 210(3) may appear to be the same, in reality, they may be quite different. For instance, traffic control at each of the junctions 210(1), 210(3) can vary. In an example, the junction 210(1) may be a three-way stop, whereas the connecting road segment 212(3) may be a major road, such that a vehicle traveling straight through the junction 210(3) from the connecting road segment 212(3) may not have a stop, whereas traffic on the fourth connecting road 212(4) must stop before entering the intersection embodied by the junction 210(4). Of course, these are but examples. In other examples, one or more of the junctions may include other features, such as crosswalks, turning lanes, yield signs, traffic lights, or the like. Moreover, the fourth connecting road segment 212(4) may be one way in either direction. Similarly, other factors may also influence traffic control at the junctions 210. For example, speed limits on the roads including the connecting road segments 212 can vary for each of the junctions 210. The junctions 210 may have additional variations, as well. By way of nonlimiting example, although the connecting roads 212 are generally illustrated as being arranged at right angles relative to adjacent segments, an angle between the road segments can vary. Moreover, individual of the junctions 210 may include crosswalks, bike lanes, physical barriers, or other features that can affect navigation therethrough. Other examples are provided herein.

Similarly, although the referenced connecting road segments 212 look substantially the same in the map 206, each may have unique features or attributes. By way of nonlimiting example, each segment may have a different curvature, a different grade, a different speed limit, a different number of lanes or lane configurations, e.g., widths, lengths or other extents, a different direction of travel for those lanes, or the like. Also in examples, the road segments 212 can include parking lanes, crosswalks, no parking zones, medians or other physical barriers, bridges, tunnels, adjacent sidewalks, speed bumps, bike lanes, or other features. Other examples are provided herein.

At operation 214, the process 200 may include comparing the segments to mapped segments and/or stereotypes from reference map data. For example, each of the segments identified by the operation 208, e.g., each of the junctions 210 and each of the connecting road segments 212, may be compared to mapped data from a navigable region, such as the verified map data 106 discussed above. The illustration accompanying the operation 214 demonstrates the first junction 210(1) from the map 206 and associated segment data 216. By way of nonlimiting example, the segment data 216 may include any of the features, attributes, and/or variations quantifiable for the junction 210(1), including but not limited to those discussed above. Comparison may be based on determining a similarity metric, as defined herein.

The example accompanying the operation 214 also shows example mapped junctions 218. For example, the mapped junctions 218 may include junction segments identified in a navigable region, such as in the verified map data 106. In some examples, each junction in the verified map data 106 can be individually stored with associated data, much like the segment data 216. In the example, a first mapped junction 218(1) shows a four-way intersection and associated data, a second mapped junction 218(2) shows a first three-way intersection and accompanying junction data, and a third mapped junction 218(3) shows a second three-way intersection and accompanying junction data. As noted, the mapped junctions 218 may be from a region in which an autonomous vehicle is verified to travel and thus it may be known with some certainty that the autonomous vehicle can navigate each of the mapped junctions 218. Accordingly, if at operation 214 it is determined that the junction 210(1) is the same as one of the mapped junctions 218, there may be reasonable expectation that the autonomous vehicle could navigate the junction 210(1) in the new region. In the example accompanying the operation 214, the junction 210(1) may be determined to be similar and/or the same as the third mapped junction 218(3). As above, this may be done based on determining a similarity score or metric associated with one or more features/parameters of the two segments.

In some implementations, the operation 214 may compare the junction 210(1) to each mapped junction 218. In other implementations, however, each of the mapped junctions 218 may be representative of a class or group of similar junctions. By way of example, an autonomous vehicle may employ the same functionality to navigate through a four-way intersection of a major street and two side streets, e.g., regardless of whether the side streets have stop signs, yield signs, and/or flashing red lights and/or regardless of a speed limit of the major street. In such instances, the mapped junctions 218 may include junction or intersection stereotypes. For example, an intersection stereotype can include one or more ranges or types of criteria within a single parameter. In the example just given, similar four-way intersections of a major street and two side streets can be grouped together, regardless of the traffic control device used at the junction of the side streets with the major street (or of the traffic control device is a device on a list of similar devices) and/or regardless of a speed limit on the major street (or if the speed limit is within some range of speed limits). In some examples, using stereotypes can reduce computational load, e.g. by comparing segments in new region to fewer maps segments, e.g., the mapped junctions 218. The use of stereotypes or classifications can reduce thousands of junctions to dozens of stereotypes, for example. In at least some examples where clustering algorithms are used to cluster segments, a mean, median, or mode of each cluster may be used as indicative of features of that segment with variances indicative of how tight each cluster is.

At operation 220, the process 200 may include identifying drivable surfaces in the new region. For example, the process 200 can include identifying those segment in the map 206 for which an analog exists in verified map data (e.g based on the comparison(s) at the operation 214). In some examples, those regions for which an analog does exist may be indicated as (potentially) drivable regions 222 (e.g., likely navigable by the autonomous vehicle) and those regions for which an analog does not exist may be indicated as undrivable regions 224 (e.g., unnavigable by the autonomous vehicle). In an example accompanying the operation 220, the second connecting road 212(2), the third connecting road 212(3), and the fourth junction 210(4) are indicated as the undrivable regions 224, whereas all remaining segments are indicated as comprising the drivable regions 222. In at least some examples, such a determination may not be so binary (e.g., drivable vs. non-drivable). In such examples, based at least in part on the similarity metric, various operations may be limited (e.g., a maximum speed limit, actions which can be performed, times and/or conditions in which autonomous driving is permitted, and the like). As a non-limiting example, if a newly mapped road segment is within 95% of features of an existing segment, similar driving features may be enabled. If, in another instance, a new segment has a similarity metric of 0.8 of a stereotypical road segment, a maximum speed limit may be set which is a fraction of a posted speed limit of the new segment.

Figure 3:
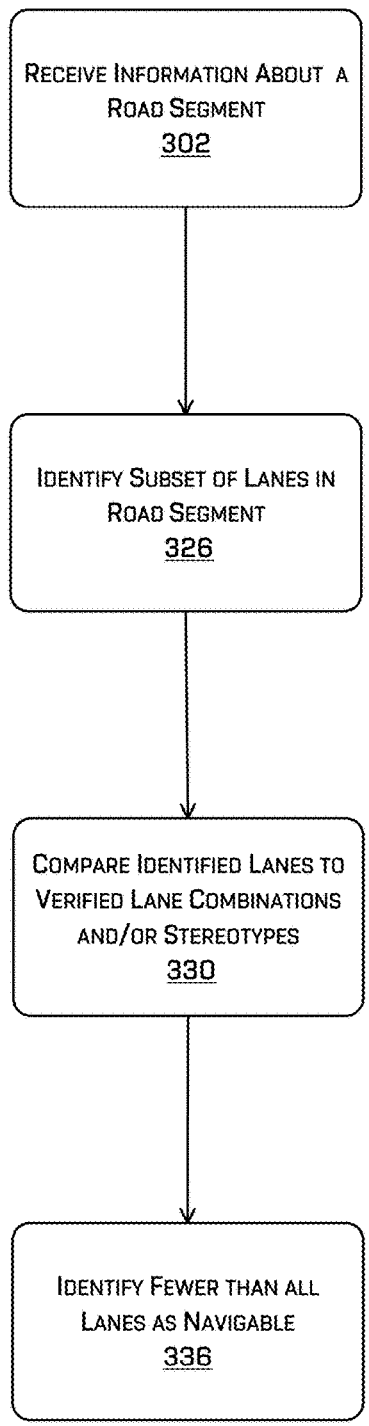
FIG. 3 includes textual and visual flowcharts to illustrate another example method for extending autonomous driving functionality to new regions.
Figure 3:
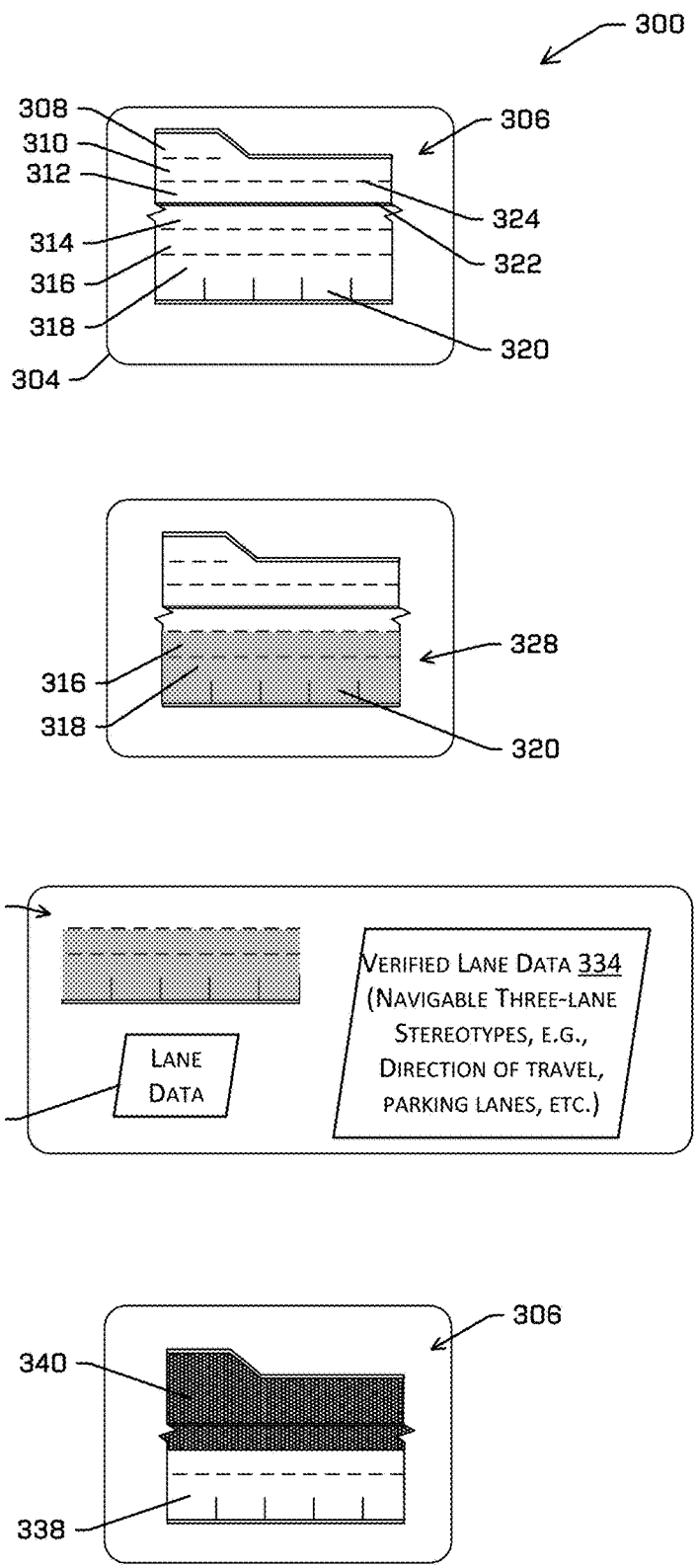

In some implementations, an autonomous vehicle can be provided with updated map data that identifies the drivable region 222, such that the autonomous vehicle can operate in the drivable region 222 in accordance with any limitations imposed. In some examples, the autonomous vehicle may operate at the exclusion of information about, e.g., to avoid, the undrivable regions 224. It still further examples, however, an indication that a region or segment is undrivable may prompt additional processing. For example, FIG. 3 illustrates an example of determining whether segments indicated as undrivable by the process 200, or some other process, may still be navigable by an autonomous vehicle. More specifically, FIG. 3 depicts a pictorial flow diagram of an example process 300 for identifying drivable subsegments, e.g., a subset of lanes, in a new region. For example, the process 300 may be implemented by one or more components of the evaluation system 102, although the process 300 is not limited to use with the evaluation system 102, and the evaluation system 102 may perform operations and/or processes in addition to or instead of the process 300.

At operation 302, the process 300 may include receiving information about a road segment. For example, the road segment may be a junction segment or a connecting road segment such as those discussed herein. In some examples, the road segment may be a segment flagged or otherwise identified, e.g. according to the process 200 described above or some other process, as undrivable. In such an example, the segment may be undrivable because it did not correspond significantly with verified map segments, as described above in connection with FIG. 2. In an example 304 accompanying the operation 302, a road segment is embodied as a connecting road segment 306. For example, the connecting road segment 306 may be one of the connecting roads 212 discussed above in connection with the process 200. In more detail, the connecting road segment 306 may include a plurality of lanes including a first lane 308, a second lane 310, a third lane 312, a fourth lane 314, a fifth lane 316, a sixth lane 318, and a parking lane including a number of parking spaces 320. As also detailed, a centerline may separate the third lane 312 from the fourth line 314 and the lane markers 324 may be provided between other of the lanes. For example, the first line 308 may be a turning lane, e.g., via which traffic may make a right turn from the road segment 306, and the second lane 310 and the third lane 312 may be used for traffic traveling in the same direction, e.g., from right to left in the illustrated orientation. In contrast, the fourth lane 314, the fifth lane 316, and the sixth lane 318 may facilitate travel in the opposite direction, e.g., left to right in the illustrated orientation. The parking spots 320 may be arranged for parallel parking adjacent the sixth lane 318.

At operation 326, the process 300 may include identifying a subset of lanes in the road segment. For example, in the example accompanying the operation 326, the process 300 may identify a subset 328 including the fifth lane 316, the sixth lane 318, and the lane including the parking spots 320. In implementations, a minimum of three lanes may be selected, e.g., because safe travel of an autonomous vehicle may require knowledge of objects, obstructions, and/or the like in a lane of travel of the vehicle as well as an adjacent lane on either side. In other examples, more or fewer lanes may be included in the subset. In a non-limiting example, only the sixth lane 318 and lane including the parking spots 320 may be used as a subset of lanes. Moreover, although the road segment 306 is a connecting road segment, similar techniques may be used to identify segments or portions of a junction segment. By way of nonlimiting example, a convergence of two connecting road segments at a junction may be identified by the operation 326, e.g., at the exclusion of other connecting roads meeting at the junction. In at least some examples where at least one lane of a segment is similar to another segment, those lanes will be preferred over other lanes for driving and/or additional limitations may be imposed on such other lanes. Other subsets or groups of features within a segment also are contemplated, including other features and attributes described herein.

At operation 330, the process 300 may include comparing identified lanes to verified lane combinations and/or stereotypes. The operation 330 may be similar to the operation 214 described above. For example, each of the lane combinations, including the lane combination 328 may be compared to mapped data from a navigable region, such as the verified map data 106 discussed above. The illustration accompanying the operation 330 demonstrates the lane combination 328 from the lane segment 306 and associated lane data 332. By way of nonlimiting example, the lane data 332 may include any features, attributes, and/or variations quantifiable for the lane combination 328, including but not limited to directions of travel for the lanes, extents of the lanes, lane marker information, speed limit information, orientations of the parking spots 320, and/or other data associated with the lane combination 328.

The example accompanying the operation 330 also shows verified lane data 334. For example, the verified lane data may include information about lane combinations identified in a navigable region, such as in the verified map data 106. In some examples, each lane combination in the verified map data 106 can be individually stored with associated data, e.g., like the lane data 332. The operation 330 may compare the lane data 332 associated with the lane combination 328 in the new region with each mapped lane combination, e.g., in the verified lane data 334, to determine a correspondence between the lane combination 328 and a lane combination for which the autonomous is verified. In other implementations, however, the verified lane data 334 may include information of classes or groups of similar lane combinations. By way of example, an autonomous vehicle may employ the same functionality to navigate on the two right-most lanes of a five-lane highway with a 65-mph speed limit as on the two right-most lanes of an eight-lane highway with a 70-mph speed limit. Thus, for example, the verified lane data 334 may include a lane stereotype that encompasses the two-lane configuration with a speed limit ranging from 65- to 70-mph. Of course, this is but one simplistic example, and additional and/or different attributes, ranges, and/or the like may be used to develop the stereotypes. In some examples, using stereotypes can reduce computational load, e.g. by comparing lane combination in a new region to fewer mapped combinations. In at least some examples, such verified lane data 334 may comprise verified (actual, successful) driving behavior of one or more autonomous vehicles. Such driving behaviors and similarity scores may be used to impose one or more constraints on driving in the newly indicated segments.

At operation 336, the process 300 may include identifying fewer than all lanes as navigable. For example, the process 300 can include determining for each combination of lanes, including the combination 328, whether an analog exists in verified map data. In some examples, those regions for which an analog does exist may be indicated as drivable regions 338 (e.g., potentially navigable by the autonomous vehicle) and those regions for which an analog does not exist may be indicated as an undrivable region 340 (e.g., unnavigable by the autonomous vehicle). In an example accompanying the operation 336, the fifth lane 316, the sixth lane 318, and the lane including the parking spots 320 are indicated as the drivable region 338, whereas the first lane 308, the second lane 310, the third lane 312, the fourth lane 314 are indicated as the undrivable region 340.

For example, and as noted above, the road segment 306 may have been identified as an undrivable road segment, e.g., because map data of navigable regions may not include a road segment with the same or similar enough characteristics that the road segment 306 would be identified as an analog to a verified-navigable road segment. As a result of the process 300, techniques described herein may identify additional portions of a new, e.g., unverified, region upon which an autonomous vehicle may operate. In examples, the autonomous vehicle may be provided with information about the drivable region 338 and accordingly may traverse the road segment 306 only in that region. In the illustrated example, the autonomous vehicle may travel only in the fifth lane 316 or the sixth of lane 318, and/or may park or otherwise stop in one of the parking spots 320. Accordingly, in the context of a ride hailing service, the vehicle may provide pickup and/or drop-off service, e.g., at the parking spots 320 even though it may not be verified for travel on all lanes of the road segment 306. Moreover, as the vehicle navigates through the drivable region 338, it may generate sensor data, e.g. using sensors mounted on the vehicle, to allow for mapping of the undrivable region 340.

Figure 4:
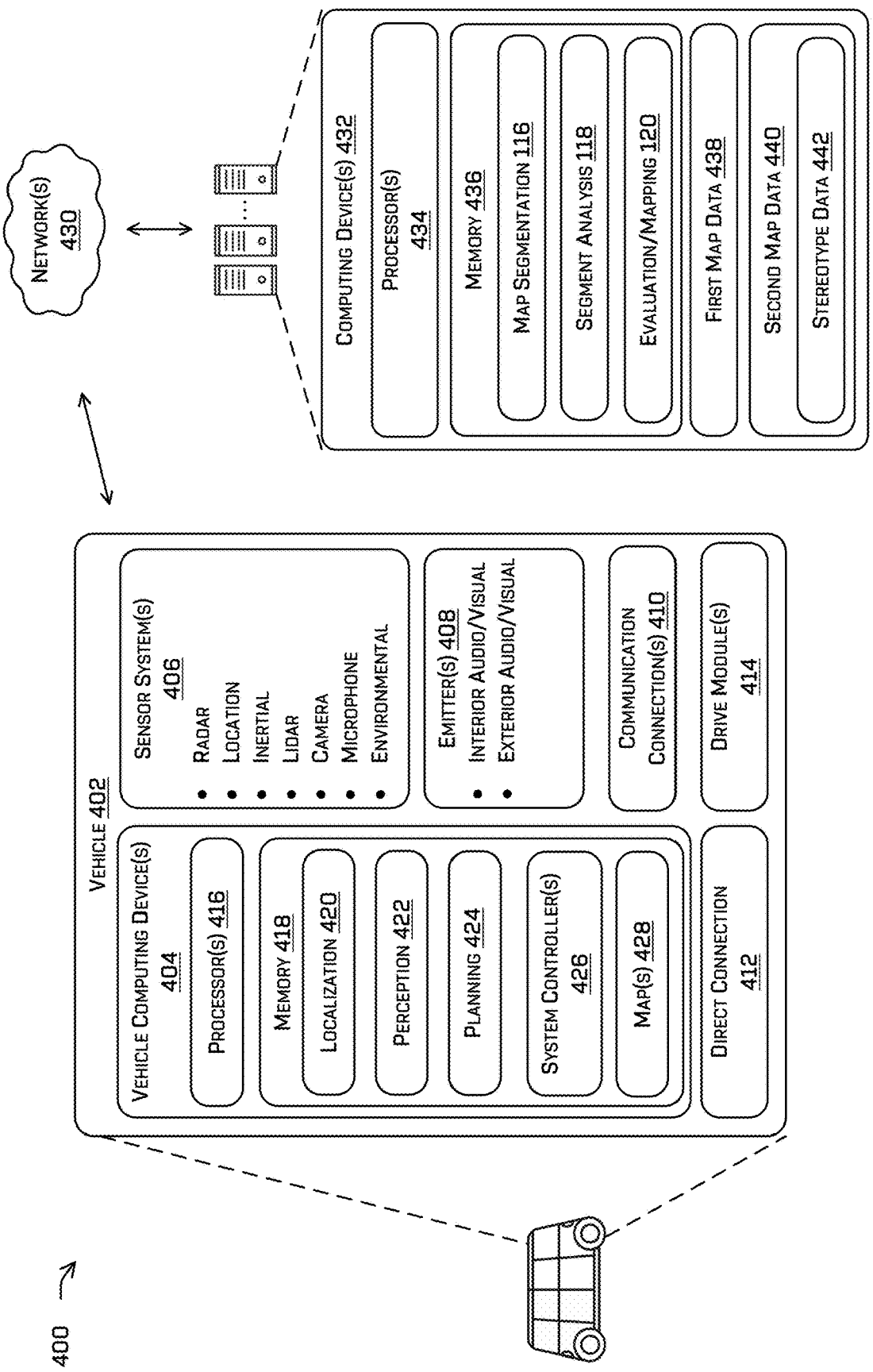
FIG. 4 is a block diagram illustrating example vehicle and remote computing systems for extending autonomous driving functionality to new regions, according to aspects of this disclosure.

FIG. 4 depicts a block diagram of an example system 400 for implementing the techniques described herein. In at least one example, the system 400 can include a vehicle 402, which be an autonomous vehicle such as autonomous vehicles described herein. The vehicle 402 can include a vehicle computing device 404, one or more sensor systems 406, one or more emitters 408, one or more communication connections 410, at least one direct connection 412, and one or more drive modules 414.

The vehicle computing device 404 can include one or more processors 416 and memory 418 communicatively coupled with the one or more processors 416. In the illustrated example, the vehicle 402 is an autonomous vehicle;

however, the vehicle 402 could be any other type of vehicle, or any other system having at least an image capture device (e.g., a camera enabled smartphone). In the illustrated example, the memory 418 of the vehicle computing device 404 stores a localization component 420, a perception component 422, a planning component 424, one or more system controllers 426, and one or more maps 428. Though depicted in FIG. 4 as residing in memory 418 for illustrative purposes, it is contemplated that the localization component 420, the perception component 422, the planning component 424, the one or more system controllers 426, and the one or more maps 428 may additionally, or alternatively, be accessible to the vehicle 402 (e.g., stored remotely).

In at least one example, the localization component 420 can include functionality to receive data from the sensor system(s) 406 to determine a position of the vehicle 402. For example, the localization component 420 can include and/or request/receive a map of an environment and can continuously determine a location of the autonomous vehicle within the map. In some instances, the localization component 420 can utilize SLAM (simultaneous localization and mapping) or CLAMS (calibration, localization and mapping, simultaneously) to receive image data, LIDAR data, radar data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a candidate trajectory, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, pedestrian, cyclist, animal, building, tree, road surface, curb, sidewalk, unknown, etc.). In additional and/or alternative examples, the perception component 422 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 424 can determine a path for the vehicle 402 to follow to traverse through an environment. For example, the planning component 424 can determine various routes and trajectories and various levels of detail. For example, the planning component 424 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 424 can generate an instruction for guiding the autonomous vehicle along at least a portion of the route from the first location to the second location. In at least one example, the planning component 424 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique.

The system controller(s) 426 can be configured to control steering, propulsion, braking, safety, emitters, communication, and other systems of the vehicle 402. The system controller(s) 426 can communicate with and/or control corresponding systems of the drive module(s) 414 and/or other components of the vehicle 402.

The map(s) 428 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the map(s) 428 may include at least one map (e.g., images and/or a mesh) generated in accordance with the techniques discussed herein. For example, the map(s) 428 may include information about drivable regions in a new environment, wherein the drivable regions are determined according to the techniques described herein. In some instances, the map(s) 428 may include information only about drivable regions, whereas other implementations can include map data of an entire region, including map data of undrivable regions. In some example, the vehicle 402 can be controlled based at least in part on the map(s) 428. That is, the maps 428 can be used in connection with the localization component 420, the perception component 422, and/or the planning component 424 to determine a location of the vehicle 402, identify objects in an environment, and/or generate routes and/or trajectories to navigate within an environment. Moreover, data from the sensor system(s) 406 and/or other data can be used to augment, supplement, and/or generate map data included in the map(s) 428.

In some examples, the map(s) 428 may be stored on a remote computing device(s) (such as the computing device(s) 432) accessible via network(s) 430. In some examples, multiple of the map(s) 428 may be stored based on, for example, a characteristic (e.g., type of entity, time of day, day of week, season of the year, etc.). Storing multiple maps 428 may have similar memory requirements, but increase the speed at which data in a heat map may be accessed.

In some instances, aspects of some or all of the components discussed herein may include any models, algorithms, and/or machine learning algorithms. For example, in some instances, the components in the memory 418 (and the memory 436, discussed below) may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 406 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the LIDAR sensors can include individual LIDAR sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device 404. Additionally, or alternatively, the sensor system(s) 406 can send sensor data, via the one or more networks 430, to the one or more computing device(s) at a particular frequency, after a lapse of a predetermined period of time, in near real-time, etc.

The emitter(s) 408 may be configured to emit light and/or sound. The emitter(s) 408 in this example can include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example can include lights to signal a direction of travel or other indicator of vehicle action (e.g., indicator lights, signs, light arrays, etc.) and/or one or more audio emitters (e.g., speakers, speaker arrays, horns, etc.) to audibly communicate with pedestrians or other nearby vehicles, one or more of which can include acoustic beam steering technology.

The communication connection(s) 410 can enable communication between the vehicle 402 and one or more other local or remote computing device(s), such as the computing device(s) 432. For instance, the communication connection(s) 410 can facilitate communication with other local computing device(s) on the vehicle 402 and/or the drive module(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communications connection(s) 410 can include physical and/or logical interfaces for connecting the vehicle computing device 404 to another computing device or a network, such as the network(s) 430. For example, the communications connection(s) 410 can enable Wi-Fi-based communication such as via frequencies defined by the IEEE 402.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

The drive module(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 414 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 414. Furthermore, the drive module(s) 414 also include one or more communication connection(s) that enable communication by the respective drive module with one or more other local or remote computing device(s).

In some examples, the vehicle 402 can have a single drive module 414. In at least one example, if the vehicle 402 has multiple drive modules 414, individual drive modules 414 can be positioned on opposite ends of the vehicle 402 (e.g., the front and the rear, etc.). In at least one example, the drive module(s) 414 can include one or more sensor systems to detect conditions of the drive module(s) 414 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 414. In some cases, the sensor system(s) on the drive module(s) 414 can overlap or supplement corresponding systems of the vehicle 402 (e.g., sensor system(s) 406).

In at least one example, the localization component 420, the perception component 422, and/or the planning component 424 can process sensor data, as described above, and can send their respective outputs, over the network(s) 430, to the computing device(s) 432. In at least one example, the localization component 420, the perception component 422, and/or the planning component 424 can send their respective outputs to the one or more computing device(s) 432 at a particular frequency, after a lapse of a predetermined period of time, in near real-time, etc. In some examples, the vehicle 402 can send raw sensor data to the computing device(s) 432. In other examples, the vehicle 402 can send processed sensor data and/or representations of sensor data to the computing device(s) 432. In some examples, the vehicle 402 can send sensor data to the computing device(s) 432 at a particular frequency, after a lapse of a predetermined period of time, in near real-time, etc. In some cases, the vehicle 402 can send sensor data (raw or processed) to the computing device(s) 432 as one or more log files.

The computing device(s) 432 can receive the sensor data (raw or processed) and can generate and/or update maps based on the sensor data. For instance, the computing device(s) 432 can compare map data of a new region, e.g., in which the autonomous vehicle 402 is not verified for driving, to verified map data, e.g., from areas in which the autonomous vehicle 402 is verified or otherwise configured for driving, to identify segments of the new region in which the autonomous vehicle 402 can travel. For instance, the computing device(s) 432 can generate updated map data including the determine-to-be navigable regions and supply or otherwise make available to the vehicle 402 the updated map data. Accordingly, the vehicle can be controlled to for identify regions in new, e.g., previously-unmapped for navigation, geographic areas shadows in images and can generate textured 3D maps without shadows.

In at least some examples, the computing device(s) 432 can include one or more processors 434 and memory 436 communicatively coupled with the one or more processors 434. The computing device(s) 432 also may include first map data 438 and second map data 440. The second map data 440 also may include stereotype data 442. Also in the illustrated example, the memory 436 of the computing device(s) 432 stores the map segmentation component 116, the segment analysis component 118, and the evaluation/mapping component 120. In at least one example, the computing device(s) 432 can include some or all of the functionality of the evaluation system 102 of FIG. 1.

The map segmentation component 116 is described above in connection with FIG. 1. In general, the map segmentation component can include feature identification components and/or a machine learning algorithm trained to identify segments of a drivable surface. In some cases, the map segmentation component 116 can receive map data, such as the first map data 438 and/or the second map data 440, and analyze the data to determine segments, such as connecting road segments and junction segments at which connecting road segments converge. Also in implementations, the map segmentation component 116 can identify sub-regions of segments, including, but not limited to, lane combinations, portions of intersections, or the like.

The segment analysis component 118 is described above in connection with FIG. 1. In general, the segment analysis component 118 can compare map segments from map data of a new region, e.g., the first map data 438, with map segments from map data of a verified region, e.g., the second map data 440. For example, the segment analysis component 118 may determine whether a segment identified in map data of a new region analogous or similar to a segment from the verified map data. As described herein, because an autonomous vehicle can successfully travel in geographical regions corresponding to the verified map data, the autonomous vehicle may also successfully travel on segments of a new region that have similar or the same features, attributes, and/or configurations.

In some instances, the segment analysis component 118 can also compare map segments from map data of a new region to stereotypes of segment classes. For instance, and as described herein, stereotypes, such as the stereotype data 442 can be used group segments on which a vehicle may function (or has proven to operate) in the same or a similar manner. Moreover, the segment analysis component 118 may generate and/or update the stereotype data 442. For example, the process 600 described herein includes examples of generating new stereotypes based on operation of the autonomous vehicle 402 in a drivable region.

The evaluator/mapping component 120 is described above in connection with FIG. 1. In general, the evaluator/mapping component 120 can aggregate or otherwise evaluate the results of the processing, e.g., comparisons, by the segment analysis component 118. For instance, the evaluator/mapping component 120 can flag or otherwise identify some portions of a new region as drivable portions and other portions of the new region as undrivable portions. The evaluator/mapping component 120 may also provide a score or other metric generally indicative of a drivability of a new region and/or segments of that region. For example, the score metric may be based at least in part on a percentage of the new region that is expected to be drivable based on comparisons of segments of the new region to segments in the mapped region.

In the example of FIG. 4, the first map data 438 may include data about a new region, such as the map data for the new region 104. As described, the first map data 438 can be any of a number of types of 2D, 3D or other map data from which features of a drivable surface can be obtained. In examples, the first map data can include satellite imagery, sensor-generated data, or other map data. The second map data 440 may be the verified map data 106 and may be similar to or the same as some or all of the map(s) 428 described above. For instance, the second map data 440 may be detailed map data associated with a region in which the vehicle 402 can operate autonomously. As noted herein, the second map data 440 can include 2D or 3D data and may be used by the localization component 420, the planning component 424, and/or other components of the vehicle 402 to navigate in the mapped region. As also illustrated in FIG. 4, the second map data 440 can also include or have associated therewith, the stereotype data 442. As described herein, the stereotype data 442 can include information, e.g., parameters, values, and/or ranges that can be used to characterize similar segments of map data. In the example, the first map data 438 and the second map data 440 are illustrated as being associated with the computing device(s) 432. In implementations, one or both of the first map data 438 and the second map data 440 can be stored in the memory 436 and/or accessible by the computing device(s) 432. By way of non-limiting example, some or all of the second map data 440 can be stored on the vehicle 402, e.g., as the map(s) 428.

The processor(s) 416 of the vehicle 402 and the processor(s) 434 of the computing device(s) 432 can be any suitable processor capable of executing instructions to process data and perform operations as described herein. By way of example and not limitation, the processor(s) 416, 434 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 and the memory 436 are examples of non-transitory computer-readable media. The memory 418 and the memory 436 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 432 and/or components of the computing device(s) 432 can be associated with the vehicle 402. That is, the vehicle 402 can perform one or more of the functions associated with the computing device(s) 432, and vice versa.

FIGS. 2, 3, 5, and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
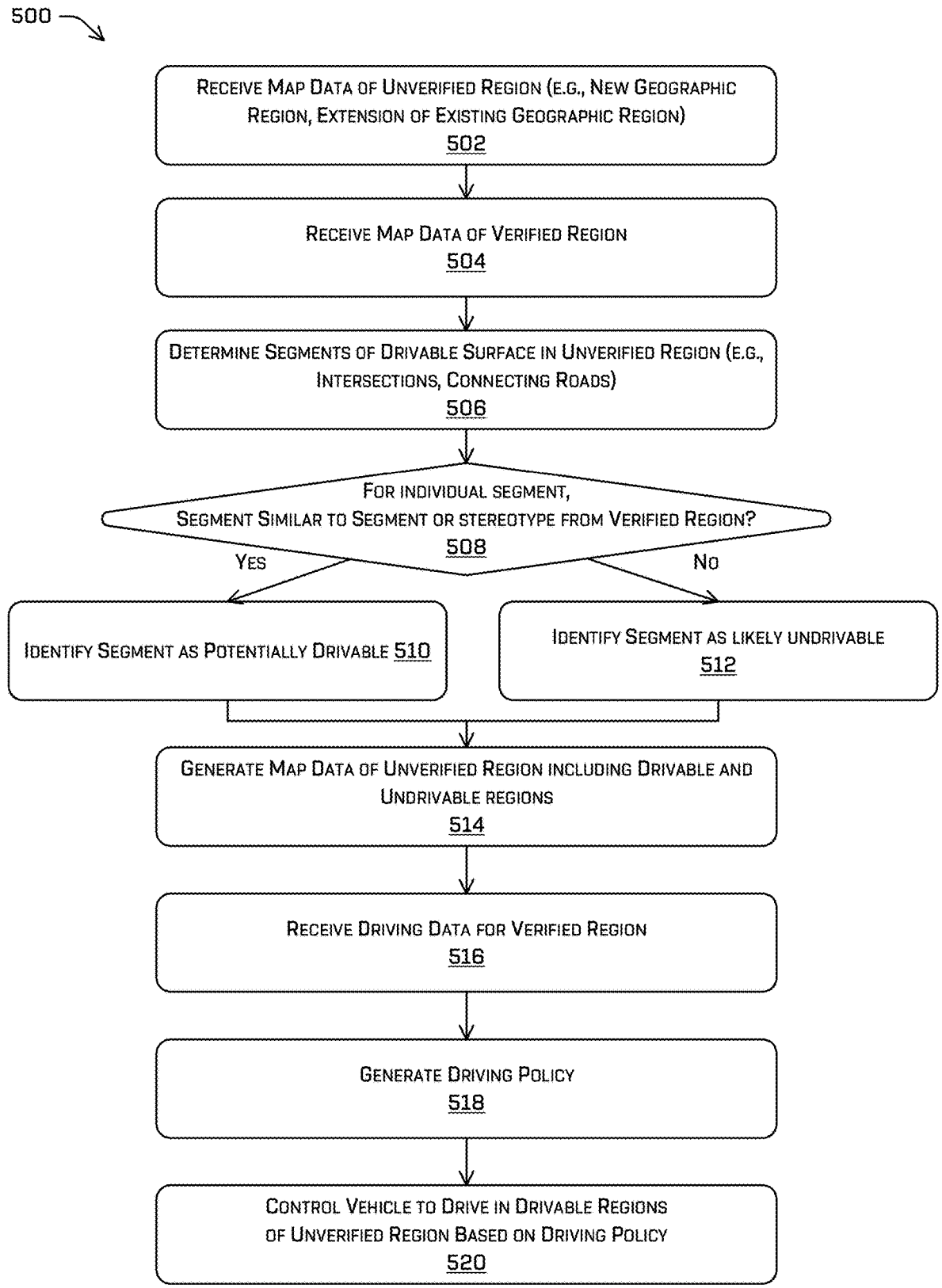
FIG. 5 is a flow chart representative of one or more processes for extending autonomous driving functionality to new regions and driving the new regions, according to aspects of this disclosure.

FIG. 5 depicts an example process 500 for determining drivable segments of a new region and controlling an autonomous vehicle according to map data generated based on the drivable segments. For example, some or all of the process 500 can be performed by one or more components in FIG. 4, as described herein. For example, some or all of the process 500 can be performed by the computing device(s) 432 and/or the autonomous vehicle 402.

At operation 502, the process 500 can include receiving map data of an unverified region. For example, the unverified region may be a new geographic region in which an autonomous vehicle is not yet been verified for travel. In some implementations, the new region may be an extension of an existing geographic region, e.g., to extend the geofence or other virtual boundary associated with a drivable area. In implementations, the map data received at the operation 502 may be any type of map data from which features and/or details of a drivable surface may be determined. In some examples, the map data may include two-dimensional and/or a three-dimensional information about the new region.

At operation 504, the process 500 can include receiving map data of a verified region. For example, an autonomous vehicle, such as the vehicle 402, may require extensive and detailed map data to navigate autonomously in an environment. For example, such map data may include three-dimensional mesh data of objects in the mapped region, including but not limited to drivable surfaces, obstructions, buildings, curbs, or the like. Moreover, such map data may include any information and/or data that can affect travel on the drivable surfaces. For instance, the map data of the verified region received at the operation 504 may include speed limit information, traffic control information, and/or any other information required to travel safely and/or legally through the verified region. In at least some examples, prior autonomous operations on such segments may be associated with the one or more segments.

At operation 506, the process 500 can include determining segments of a drivable surface in the unverified region. For example, the map segmentation component 116 can identify portions of drivable surfaces in the unverified region. By way of nonlimiting example, such segments may include junctions of connecting roads and/or connecting roads extending between junctions. In some implementations a segment may be a subset of a junction and/or a connecting road segment. In the example of FIG. 3, described herein, a segment may include a grouping of traffic lanes in a connecting road segment or at a junction. In some instances, the map segmentation component 116 can perform image processing techniques to identify the drivable surface and/or segments thereof. In at least some examples, such segments may be determined based on one or more clustering algorithms.

At operation 508, the process may include, for individual segments, determining whether a segment is similar to a segment or stereotype from the verified region. For example, the segment analysis component 118 may compare segments from the new region (as determined at the operation 506) to mapped segments from a verified region. For example, the segment analysis component 118 made determine a similarity score or other metric. Such a similarity score may be, for example, a distance (e.g., a weighted Euclidian distance) between one or more features/parameters associated with the two segments. In some examples, the segment analysis component 118 may determine whether values associated with certain features or attributes of the segments from the new region comport with those features/attributes in segments of the mapped data, as descried herein.

If, at the operation 508, it is determined that an individual segment is similar to a segment or stereotype from the verified region (e.g., the similarity score or metric meets or exceeds a threshold value), at operation 510, the process 500 can identify that segment as potentially drivable. For example, as described herein, the map data of the verified region can include segments of a drivable region that the autonomous vehicle can readily navigate. In at least some examples, a level of autonomy associated therewith may be based at least in part on the similarity score. As described in detail above, as the similarity score differs, one or more functions of autonomy may be constrained with respect to the new regions. Accordingly, when the segment analysis component 118 determines that a segment in a new region is substantially similar to a segment in the verified region, the process 500 can determine that the autonomous vehicle is also likely to operate successfully on the analogous segment in the new region.

In contrast, if at operation 508, it is determined that an individual segment is not similar to a segment or stereotype from the verified region (e.g., the similarity score does not meet or exceed a threshold score), at operation 512, the process 500 can include identifying the segment as likely undrivable. Accordingly, the operations 508, 510, 512 may be used to determine whether segments in a new region are drivable or not drivable. In implementations, the extent of an entire drivable surface may be parsed into discrete segments, with each segment being identified as either drivable or not drivable.

At operation 514, the process 500 can include generating map data of the new, e.g., unverified region to include the drivable and undrivable regions. For example, the map data of the unverified region received at the operation 502 may be supplemented to include flags, tags, or other indications associated with road segments that indicate whether such segments are drivable or undrivable, and/or any additional limitations.

At operation 516, the process 500 can include receiving driving data for the verified region. For example, because a segment in the unverified region is indicated as drivable based on that segment's similarity to a segment in the verified region, driving data for controlling a vehicle in the segment in the verified region may be useful to navigate the similar, unverified segment. In some examples, driving data may be limited only to those segments from the verified region that were deemed similar to segments in the unverified region, although in other implementations, more or less driving data may be received.

At operation 518, the process 500 can include generating a driving policy. For example, a driving policy can be a set of rules, controls, limits, or other data that enables or otherwise informs autonomous driving by a vehicle, such as the vehicle 402. The driving policy may be implemented by a vehicle as it navigates on the potentially drivable segments of the new region. Thus, for example, the driving policy may include information to assist the vehicle in travelling on the potentially drivable segments and to avoid the undrivable segments. In some instances, the driving policy can include all functions, controls, or the like that are used to navigate autonomously in the verified region. In other implementations, the driving policy may only include information about controlling the autonomous vehicle in those segments that are matched to segments in the new region. Moreover, the driving policy can be based at least in part on a degree of similarity. For instance, for a segment in the new region that is deemed similar to, but does not match exactly, a segment in the verified region, the driving policy can include information about limited functionalities for traversing that segment in the new region. For instance, the driving policy can limit a speed limit at which the vehicle can travel through the segment, can cause the vehicle to refrain from performing certain actions, or the like.

At operation 520, the process 500 can include controlling a vehicle to drive in the drivable regions of the unverified region based on the driving policy. For example, the map data generated at the operation 514 can be uploaded to or made available to an autonomous vehicle, such as the autonomous vehicle 402, and the autonomous vehicle 402 can use the map data associated with the drivable regions for traveling in the new region. The autonomous vehicle 402 can also use the driving data received at the operation 516. As described herein, an autonomous vehicle may be expected to be operational in the segments indicated as drivable. Moreover, in some implementations, as the vehicle travels through the new region in the drivable segments, the vehicle may collect sensor data, e.g. using one or more sensor systems disposed on or otherwise associated with the vehicle, and such sensor data may be used to supplement the maps, e.g., by obtaining information about areas indicated as undrivable and/or to gain additional, more detailed information about areas indicated as drivable. As also described herein, functionality of the vehicle 402 may be limited in segments of the unverified region, e.g., based on the similarity score and/or other parameters.

Figure 6:
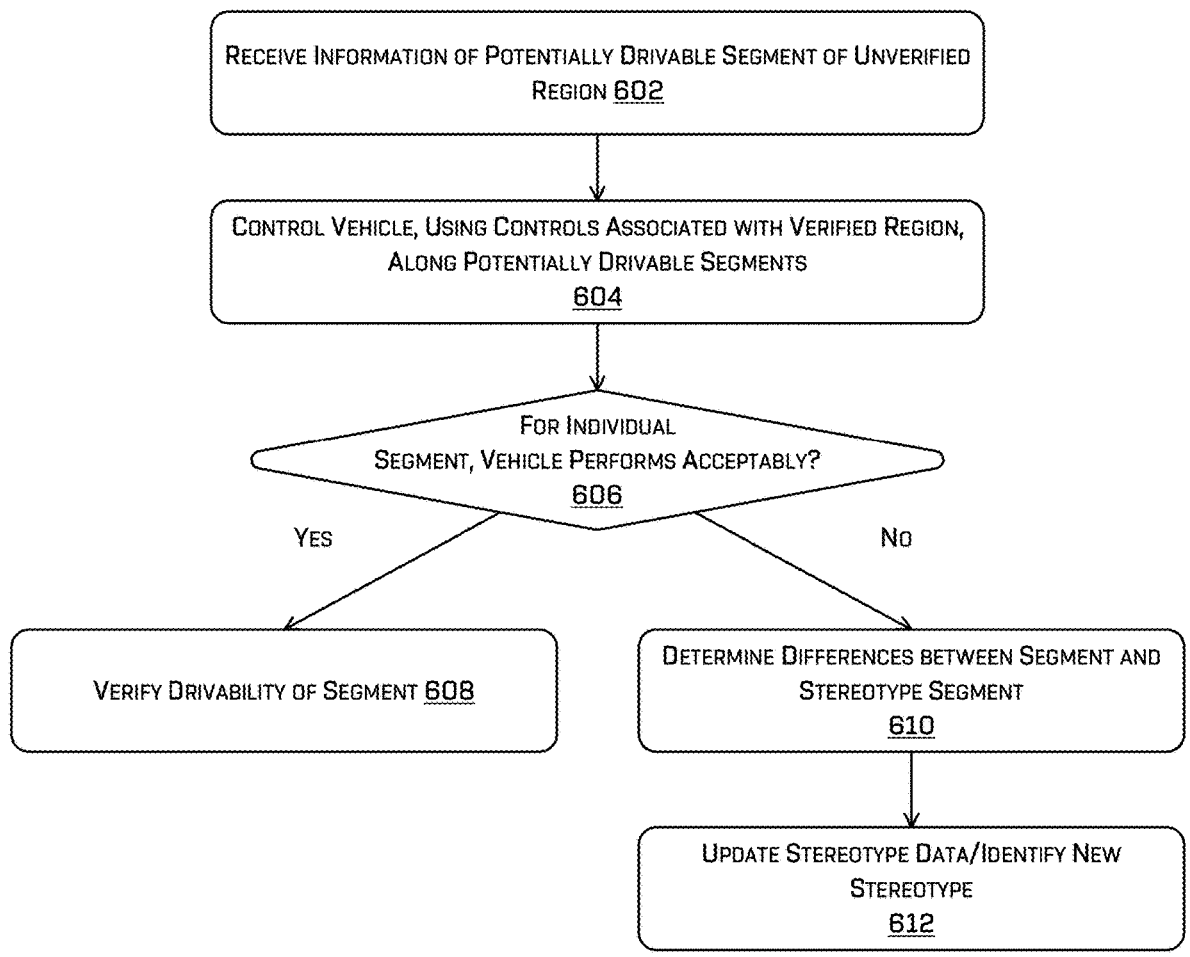
FIG. 6 is a flow chart representative of one or more processes for classifying road segments for use in extending autonomous driving functionality to new regions, according to aspects of this disclosure.

FIG. 6 illustrates an example process 600 of verifying the drivability of new regions and of generating stereotypes or other segment classifications. In some examples, the process 600 can be carried out at least in part by the autonomous vehicle 402. However, some or all of the process 600 may be carried out by other vehicles under systems, and the autonomous vehicle 402 is not limited to implementation of the process 600.

At operation 602, the process 600 includes receiving information about potentially drivable segments of an unverified region. For instance, and as just described with regard to FIG. 5, techniques described herein may be used to determine segments of a road or other drivable surface on which an autonomous vehicle is expected to be able to operate, e.g., because the segments of the new region are substantially the same as or conform to stereotypes or groups associated with verified map segments. In some instances, map data of the unverified region may be updated to identify those potentially drivable segments.

At operation 604, the process 600 may include controlling the vehicle, using controls associated with the verified region, along the potentially drivable segments. For example, an autonomous vehicle, such as the vehicle 402, may include functions, rules, and/or other control logic that allows the vehicle to navigate verified, e.g., mapped, segments. In implementations, these controls may be implemented at the operation 604 to control the vehicle in segments determined to be analogous to those from the mapped region.

At operation 606, the process 600 can include, for individual segments, determining whether the vehicle performs acceptably. For example, although techniques described herein can identify segments in which an autonomous vehicle is expected to operate successfully, operation of the vehicle on those segments may still require testing, e.g. to confirm operation is in fact, successful. In some implementations, the vehicle can generate information as it attempts to travel on the indicated as drivable portions. In some examples, successful navigation in the segment may include traversing from a start or origination point to a destination while passing through the segment. In other examples, acceptable operation may include a temporal component, e.g. a determination that the vehicle traveled from the origination point to the destination in a specific time. Acceptable performance may also consider whether the vehicle conforms to other driving parameters, including, but not limited to safety parameters, e.g., maintaining a minimum distance from objects in the environment, maintaining a time gap between a lead vehicle, maintaining a time to collision at or below a threshold time, or other parameters. In still further examples, parameters affecting passenger comfort may be assessed to determine whether the vehicle was successful. For instance, a number and severity of accelerations and decelerations, a severity of maneuvering or turning, or the like as the vehicle travels through the segment may also be considered. In those examples in which additional limitations were placed on driving, such limitations may be incrementally removed based on one or more successful drives over such segments (e.g., by increasing a maximum speed limit, allowing more complex maneuvers, and the like).

If, at the operation 606, is determined that the vehicle does perform acceptably on the individual segment, at operation 608, the process 600 may include verifying drivability of the segment. For instance, if the vehicle performs according to one or more expectations or requirements, the segment of the new region identified using techniques described herein can be indicated as a verified segment.

Alternatively, if, at the operation 606, it is determined that the vehicle does not perform acceptably on the individual segment, at operation 610, the process 600 may include determining differences between the segment and the verified segment or stereotype to which the segment was compared. For example, and as discussed herein, some implementations may determine segments to be similar to each other based on their conformity with a stereotype, and/or despite some difference in attributes. The operation 610 may identify those differences.

At operation 612, the process 600 can include updating stereotype data/identifying a new stereotype. For example, when the vehicle does not perform as expected in a segment identified or believed to be a drivable segment, it may be determined that differences between the segment and the segment or stereotype believed to be analogous are significant. Accordingly, in some instances, the segment analysis component 118 can update the stereotype, e.g. such that a value or attribute associated with the segment in the new region is no longer included in the stereotype. In other examples, other, e.g., not previously considered attributes, may also be considered. When such a new or divergent attribute is identified, a new stereotype may be generated to include a different range or value associated with that attribute.

Thus, according to the techniques described herein, functionality of autonomous vehicles may be more readily extended to new geographical areas. For example, segments of map data can be compared to determine similarities between new and already mapped regions. Also in implementations, information about different features and attributes other than those ascribable to the segments of the drivable surface, as detailed above, may also be considered. By way of nonlimiting example, techniques described herein can also include filtering new regions to determine a baseline compatibility of the autonomous vehicle with the new region. For instance, verified map data for a first city in a first climate and with first driving attributes may be more readily compared to regions with a similar climate and attributes.

EXAMPLE CLAUSES

A: An example computer-implemented method includes: receiving first map data including information about a first drivable surface in a first geographic region and one or more traffic features associated with the first drivable surface, the one or more traffic features comprising one or more of a number of traffic lanes, a traffic lane type, lane geometry, or traffic control information; determining, based at least in part on the one or more traffic features, a plurality of first segments of the first drivable surface; determining, for a first segment of the plurality of first segments and based at least in part on the one or more traffic features, a plurality of first segment parameters; receiving second map data associated with a second geographic region navigable by an autonomous vehicle, the second map data comprising information about a plurality of second segments of a second drivable surface in the second geographic region; determining, based at least in part on the plurality of first segment parameters and the second map data, a similarity metric indicative of a similarity between the first segment and one or more of the plurality of second segments; and determining, based at least in part on the similarity metric, that the autonomous vehicle can navigate the first segment.

B: The computer-implemented method of example A, wherein the similarity metric is based at least in part on the one or more traffic features associated with the first segment and one or more second traffic features associated with the second segment, and wherein the method further comprises, controlling, based at least in part on the similarity metric, an autonomous vehicle to traverse the second segment.

C: The computer-implemented method of example A or example B, wherein: the second plurality of segments comprise a plurality of representative segments, and determining the similarity metric comprises comparing the one or more traffic features to one or more second traffic features associated with the second segment, the method further comprising: receiving driving data associated with an autonomous vehicle driving on the second segment; and controlling the autonomous vehicle to traverse the first segment based at least in part on the driving data.

D: The computer-implemented method of any one of example A through example C, wherein: the first segment comprises a road segment including a plurality of lanes, determining the similarity metric is based at least in part on comparing a subset of the plurality of lanes with lane combinations in the second map data, and determining that the autonomous vehicle can navigate the first segment comprises determining that the autonomous vehicle can navigate a portion of the first segment comprising the subset of the plurality of lanes.

E: An example system includes: one or more processors; and one or more non-transitory computer-readable media storing instructions executable by the one or more processors, wherein the instructions program the one or more processors to perform acts comprising: receiving first map data including information about a first drivable surface in a first geographic region; determining a plurality of first segments of the first drivable surface, a first segment of the plurality of first segments associated with one or more first parameters; receiving second map data associated with a second geographic region, the second map data comprising information about a plurality of second segments of a second drivable surface navigable by an autonomous vehicle, a second segment of the plurality of second segments associated with one or more second parameters; determining, based at least in part on the one or more first parameters and one or more second parameters, a similarity metric indicating a similarity between the first segment and the second segment; determining, based at least in part on the similarity metric, regions of the first drivable surface navigable by the autonomous vehicle; and controlling an autonomous vehicle to drive on the regions.

F: The system of example E, wherein the one or more first parameters comprise at least one of a number of traffic lanes, a traffic lane type, a width, a length, a grade, a curvature, or traffic control information associated with the first segment.

G: The system of example E or example F, the actions further comprising: determining, based at least in part on the similarity metric being below a threshold similarity, second regions of the first drivable surface associated with areas for the autonomous vehicle to avoid; and generating updated map data of the first drivable surface including the regions and the second regions.

H: The system of any one of example E through example G, wherein: the second plurality of segments comprises a subset of all segments of the second map data indicative of representative segments of the second map data, and determining the similarity is based at least in part on comparing values of the one or more first segment parameters to the one or more of the second parameters.

I: The system of any one of example E through example H, the acts further comprising: determining a maximum similarity metric between the first segment and any of the plurality of second segments is less than a threshold similarity; and based at least in part on the maximum similarity metric being less than the threshold similarity, at least one of updating the second plurality of segments or creating a new representative segment.

J: The system of any one of example E through example I, the acts further comprising: determining, based at least in part on the similarity metric, one or more limitations for controlling a second vehicle, the one or more limitations comprising a maximum speed limit.

K: The system of any one of example E through example J, determining the plurality of first segments of the first drivable surface comprises clustering portions of the first drivable surface based at least in part on the one or more first parameters, the one or more first parameters comprising at least one of a speed limit, a width of at least a portion of a lane, a number of lanes, non-drivable regions, an incline, a curvature, or a permitted type of travel on or adjacent lanes in the road segment.

L: The system of any one of example E through example K, wherein a first segment comprises an intersection and the one or more first parameters comprise at least one of a number of road segments joining at the intersection, an angle between road segments joining at the intersection, traffic control information at a termination of the road segments at the intersection, or information about agent crossings at the intersection.

M: The system of any one of example E through example L, wherein one of the plurality of drivable surface segments comprises a road segment having a plurality of lanes and a first segment of the individual segments comprises a subset of the plurality of lanes, and the determining the regions of the first drivable surface comprises determining that the autonomous vehicle can navigate the subset of the plurality of lanes and that the autonomous vehicle cannot navigate lanes of the plurality of lanes other than the subset.

N: The system of any one of example E through example M, the acts further comprising: receiving driving data associated with the second segment; and associating a driving policy with the first segment based at least in part on the similarity score and the driving data.

O: The system of any one of example E through example N, wherein the driving policy comprises a maximum speed limit.

P: One or more example non-transitory computer-readable media storing instructions that, when executed, cause one or more processors to perform operations comprising: receiving first map data including first information about a first drivable surface in a first geographic region; determining, based at least in part on the first information, a plurality of first segments of the first drivable surface; receiving second map data associated with a second geographic region, the second map data comprising second information about a plurality of second segments of a second drivable surface in the second geographic region navigable by an autonomous vehicle; determining, for a first segment of the plurality of first segments, one or more first segment parameters of the first segment; determining, using the second map data and the one or more first segment parameters, a similarity metric indicative of a similarity between the first segment and a second segment of the plurality of second segments; and determining, based on the similarity metric, a driving policy for an autonomous vehicle with respect to the first segment.

Q: The non-transitory computer-readable media of example P, wherein: determining the plurality of first segments is based at least in part on clustering portions of the first drivable surface based at least in part on the first information, determining the plurality of second segments is based at least in part on clustering portions of the second drivable surface based at least in part on the second information, and determining the similarity metric comprises comparing a first portion of the first information associated with the first segment and a second portion of the second information associated with the second segment.

R: The non-transitory computer-readable media of example P or example Q, wherein the driving policy comprises: refraining from driving, driving under a maximum speed limit, or refraining from performing one or more actions.

S: The non-transitory computer-readable media of any one of example P through example R, wherein: the plurality of second segments comprises one or more representative segments, a representative segment of the one or more representative segments associated with one or more parameters and values, and the determining the similarity metric is based at least in part on comparing values of the first parameters to values for one or more of second parameters associated with the second segment.

T: The non-transitory computer-readable media of any one of example P through example S, the acts further comprising: receiving driving data associated with a vehicle navigating the first segment, wherein the driving policy is further based at least in part on the driving data.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A computer-implemented method comprising:
   receiving first map data including information about a first drivable surface in a first geographic region and one or more traffic features associated with the first drivable surface, the one or more traffic features comprising one or more of a number of traffic lanes, a traffic lane type, lane geometry, or traffic control information;
   determining, based at least in part on the one or more traffic features, a plurality of first segments of the first drivable surface;
   determining, for a first segment of the plurality of first segments and based at least in part on the one or more traffic features, a plurality of first segment parameters;
   receiving second map data associated with a second geographic region navigable by an autonomous vehicle, the second map data comprising information about a plurality of second segments of a second drivable surface in the second geographic region, wherein the first geographic region is different than the second geographic region;
   determining, based at least in part on the plurality of first segment parameters and the second map data, a similarity metric indicative of a similarity between the first segment and one or more of the plurality of second segments; and
   determining, based at least in part on the similarity metric, that the autonomous vehicle can navigate the first segment.

2. The computer-implemented method of claim 1, wherein the similarity metric is based at least in part on the one or more traffic features associated with the first segment and one or more second traffic features associated with the second segment, and
   wherein the method further comprises, controlling, based at least in part on the similarity metric, an autonomous vehicle to traverse the second segment.

3. The computer-implemented method of claim 1, wherein:
   the second plurality of segments comprise a plurality of representative segments, and
   determining the similarity metric comprises comparing the one or more traffic features to one or more second traffic features associated with the second segment, the method further comprising:
   receiving driving data associated with an autonomous vehicle driving on the second segment; and
   controlling the autonomous vehicle to traverse the first segment based at least in part on the driving data.

4. The computer-implemented method of claim 3, wherein:
   the first segment comprises a road segment including a plurality of lanes,
   determining the similarity metric is based at least in part on comparing a subset of the plurality of lanes with lane combinations in the second map data, and
   determining that the autonomous vehicle can navigate the first segment comprises determining that the autonomous vehicle can navigate a portion of the first segment comprising the subset of the plurality of lanes.

5. A system comprising:
   one or more processors; and
   one or more non-transitory computer-readable media storing instructions executable by the one or more processors, wherein the instructions program the one or more processors to perform acts comprising:
   receiving first map data including information about a first drivable surface in a first geographic region;
   determining a plurality of first segments of the first drivable surface, a first segment of the plurality of first segments associated with one or more first parameters;
   receiving second map data associated with a second geographic region that is different than the first geographic region, the second map data comprising information about a plurality of second segments of a second drivable surface navigable by an autonomous vehicle, a second segment of the plurality of second segments associated with one or more second parameters;
   determining, based at least in part on the one or more first parameters and one or more second parameters, a similarity metric indicating a similarity between the first segment and the second segment;
   determining, based at least in part on the similarity metric, regions of the first drivable surface navigable by the autonomous vehicle; and
   controlling an autonomous vehicle to drive on the regions.

6. The system of claim 5, wherein the one or more first parameters comprise at least one of a number of traffic lanes, a traffic lane type, a width, a length, a grade, a curvature, or traffic control information associated with the first segment.

7. The system of claim 5, the acts further comprising:
   determining, based at least in part on the similarity metric being below a threshold similarity, second regions of the first drivable surface associated with areas for the autonomous vehicle to avoid; and
   generating updated map data of the first drivable surface including the regions and the second regions.

8. The system of claim 5, wherein:
   the second plurality of segments comprises a subset of all segments of the second map data indicative of representative segments of the second map data, and
   determining the similarity is based at least in part on comparing values of the one or more first segment parameters to the one or more of the second parameters.

9. The system of claim 8, the acts further comprising:
determining a maximum similarity metric between the first segment and any of the plurality of second segments is less than a threshold similarity; and
based at least in part on the maximum similarity metric being less than the threshold similarity, at least one of updating the second plurality of segments or creating a new representative segment.

10. The system of claim 8, the acts further comprising:
determining, based at least in part on the similarity metric, one or more limitations for controlling a second vehicle, the one or more limitations comprising a maximum speed limit.

11. The system of claim 5, determining the plurality of first segments of the first drivable surface comprises clustering portions of the first drivable surface based at least in part on the one or more first parameters, the one or more first parameters comprising at least one of a speed limit, a width of at least a portion of a lane, a number of lanes, non-drivable regions, an incline, a curvature, or a permitted type of travel on an adjacent lane.

12. The system of claim 10, wherein a first segment comprises an intersection and the one or more first parameters comprise at least one of a number of road segments joining at the intersection, an angle between road segments joining at the intersection, traffic control information at a termination of the road segments at the intersection, or information about agent crossings at the intersection.

13. The system of claim 5, wherein one of the plurality of first segments comprises a road segment having a plurality of lanes and the first segment comprises a subset of the plurality of lanes, and
the determining the regions of the first drivable surface comprises determining that the autonomous vehicle can navigate the subset of the plurality of lanes and that the autonomous vehicle cannot navigate lanes of the plurality of lanes other than the subset.

14. The system of claim 5, the acts further comprising:
receiving driving data associated with the second segment; and
associating a driving policy with the first segment based at least in part on the similarity metric and the driving data.

15. The system of claim 14, wherein the driving policy comprises a maximum speed limit.

16. One or more non-transitory computer-readable media storing instructions that, when executed, cause one or more processors to perform operations comprising:
receiving first map data including first information about a first drivable surface in a first geographic region;
determining, based at least in part on the first information, a plurality of first segments of the first drivable surface;
receiving second map data associated with a second geographic region that is different than the first geographic region, the second map data comprising second information about a plurality of second segments of a second drivable surface in the second geographic region navigable by an autonomous vehicle;
determining, for a first segment of the plurality of first segments, one or more first segment parameters of the first segment;
determining, using the second map data and the one or more first segment parameters, a similarity metric indicative of a similarity between the first segment and a second segment of the plurality of second segments; and
determining, based on the similarity metric, a driving policy for an autonomous vehicle with respect to the first segment.

17. The non-transitory computer-readable media of claim 16, wherein:
determining the plurality of first segments is based at least in part on clustering portions of the first drivable surface based at least in part on the first information,
determining the plurality of second segments is based at least in part on clustering portions of the second drivable surface based at least in part on the second information, and
determining the similarity metric comprises comparing a first portion of the first information associated with the first segment and a second portion of the second information associated with the second segment.

18. The non-transitory computer-readable media of claim 17, wherein the driving policy comprises at least one of:
refraining from driving,
driving under a maximum speed limit, or
refraining from performing one or more actions.

19. The non-transitory computer-readable media of claim 16, wherein:
the plurality of second segments comprises one or more representative segments,
a representative segment of the one or more representative segments associated with one or more parameters and values, and
the determining the similarity metric is based at least in part on comparing values of the first segment parameters to values for one or more of second parameters associated with the second segment.

20. The non-transitory computer-readable media of claim 19, the operations further comprising:
receiving driving data associated with a vehicle navigating the first segment,
wherein the driving policy is further based at least in part on the driving data.

* * * * *